May 30, 1944. C. W. WATSON 2,350,298
MACHINE FOR MOLDING BRICKS
Filed Jan. 5, 1943 3 Sheets-Sheet 1
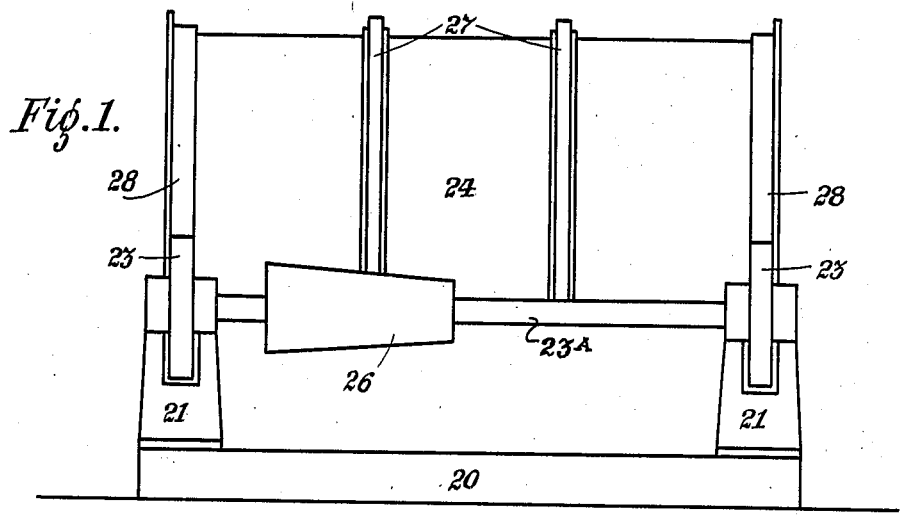
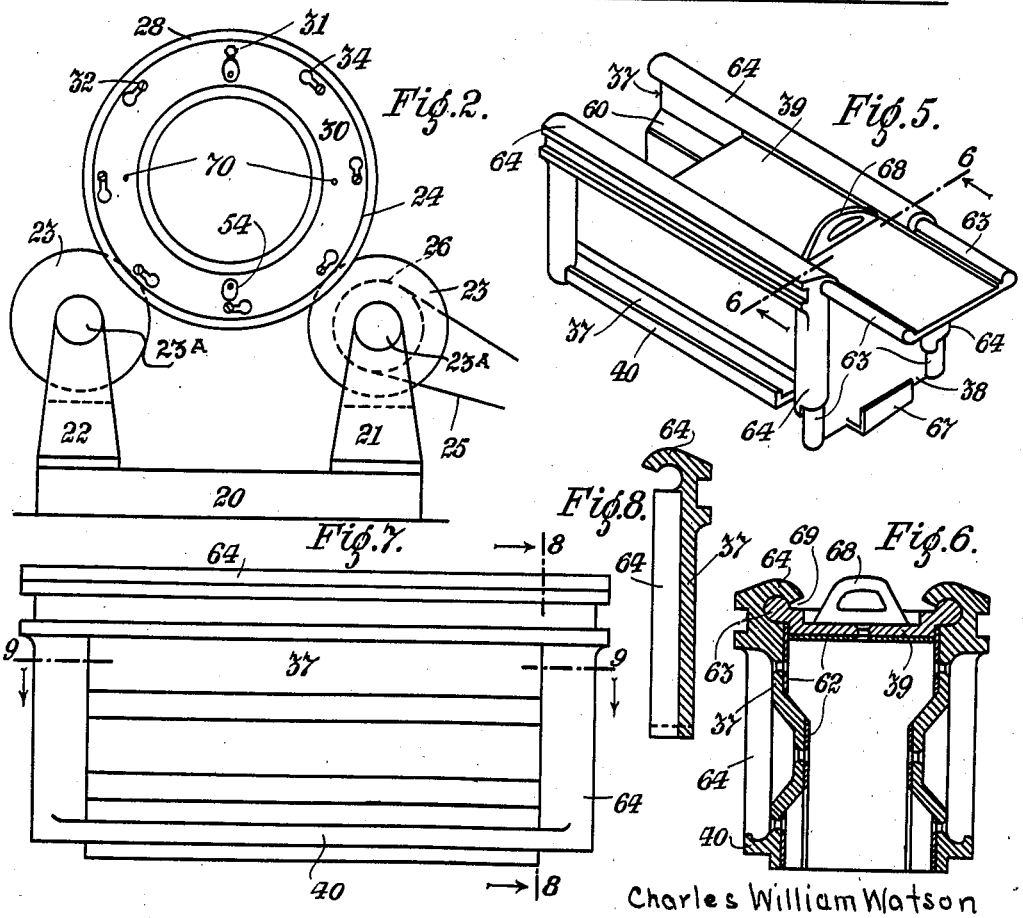
Charles William Watson
INVENTOR

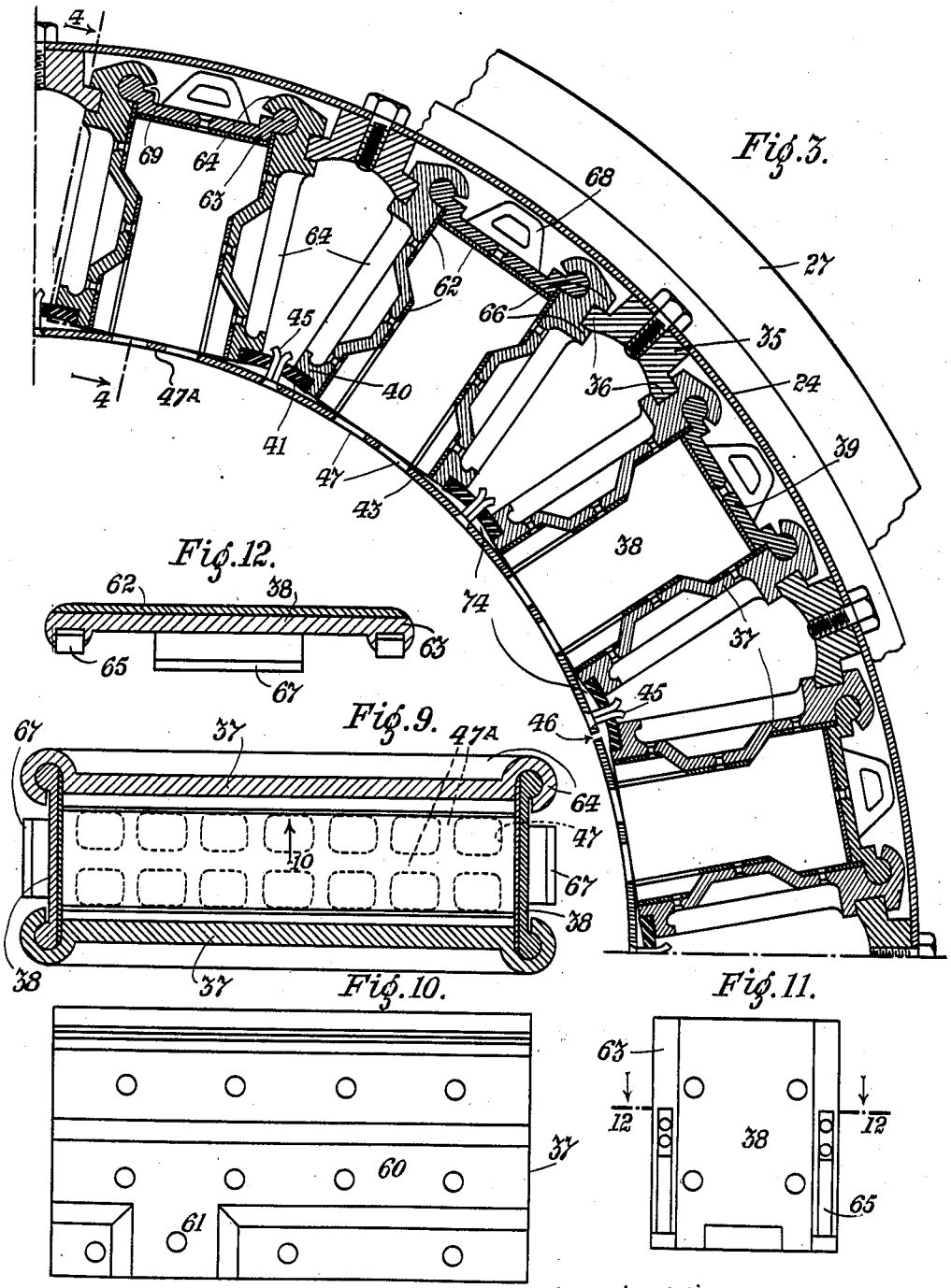

May 30, 1944.     C. W. WATSON     2,350,298
MACHINE FOR MOLDING BRICKS
Filed Jan. 5, 1943     3 Sheets-Sheet 3
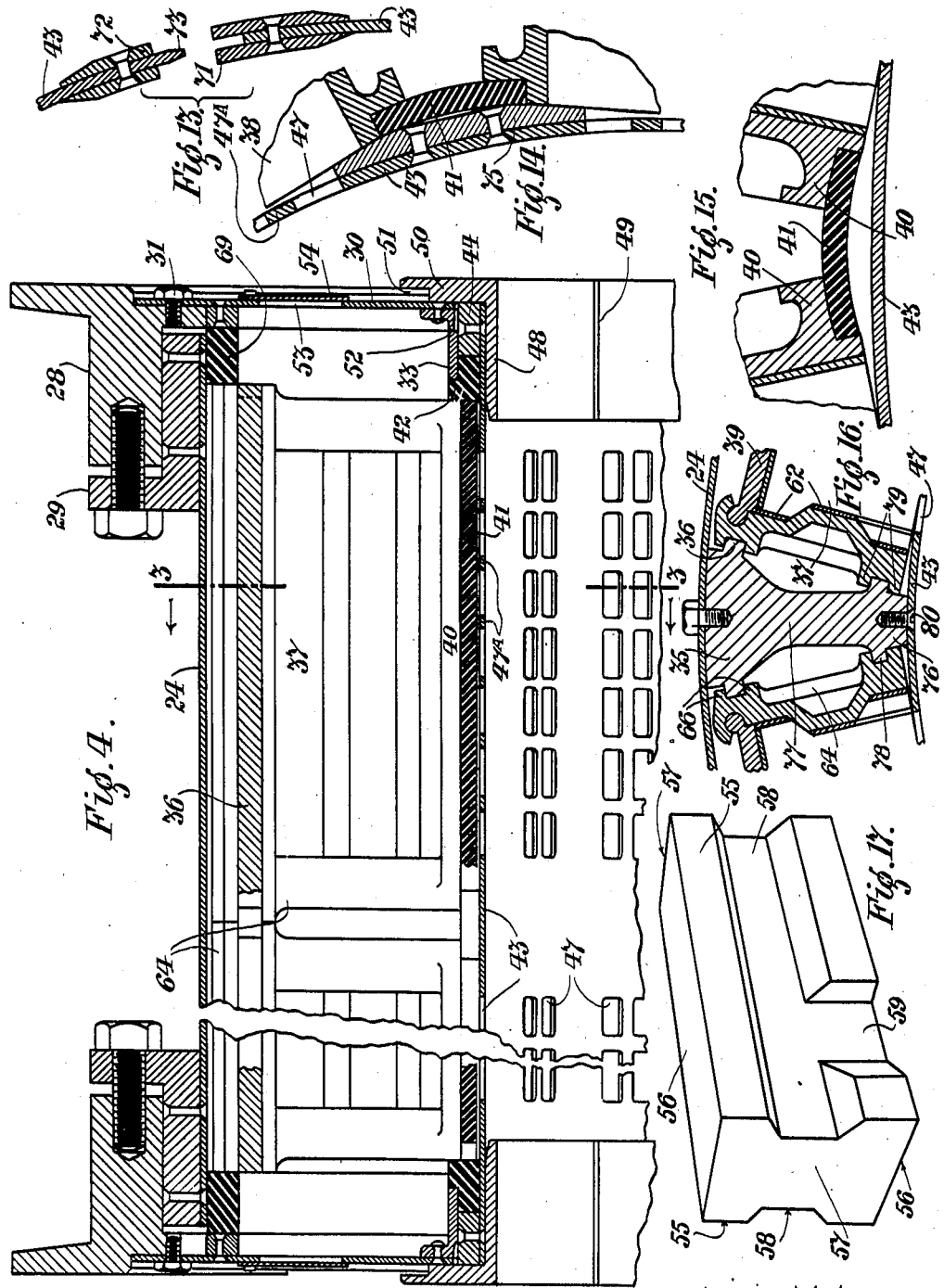
Charles William Watson
INVENTOR
By [signature]
his ATTY.

Patented May 30, 1944

2,350,298

UNITED STATES PATENT OFFICE 2,350,298

MACHINE FOR MOLDING BRICKS

Charles William Watson, Wallington, England

Application January 5, 1943, Serial No. 471,323
In Great Britain June 24, 1941

11 Claims. (Cl. 25—41)

This invention relates to a machine for molding bricks for building.

In the art of brick making the inclusion of fluid, whether gaseous or aqueous, in a mass of the plastic material leaves or creates cavities or pockets in the finished bricks, in many instances unfillable, resulting in poor or faulty products which are deficient in strength, durability, and other desirable qualities.

An object of the invention is, inter alia, the distribution of plastic material comminuted as required into an assembly of molds, the de-aeration of the material during the molding operation, the progressive filling of vacancies, interstices or the like with the material, the reduction and/or extraction of surplus moisture and consolidation of the plastic material in its configuring molds, the various steps other than the supply of the molding material to the machine to be effected by pressure due to centrifugal force generated in the molding operation.

Another object of the invention is to provide a centrifugal brick-molding machine in use of which one can use as the plastic material a concrete mixture—that is, a mixture which ordinarily comprises an aggregate of sand and gravel consolidated by a cement, for example Portland cement—and which therefore will eliminate necessity for subsequent baking in kilns with their high initial costs and unavoidable labour and firing expenses. Thus it will be possible to manufacture bricks on the site of brick-building operations by installing a portable centrifugal-molding machine there and in this way reduce freight, transport costs, demurrage and damage of various kinds.

One may use as constituents a variety of molding materials, whether of fine granulation or otherwise, whether simple or compound in character, and whether separately or mixed with other materials of selected gauge, the mass being rendered plastic by aqueous addition before submission to centrifugal action in the molding machine.

A further object is to provide molds which are carried on rails located in a rotatable cylinder, the plastic material being fed into a coaxial perforated inner cylinder and distributed thereby under centrifugal pressure to the inter-cylinder molds, the cylinders and molds being rotated as a unit about a common axis and the velocity and therefore the compression being under control and adjustable to requirements.

A machine exemplifying how the invention may be carried out in practice will now be described with reference to the accompanying drawings, in which:

Fig. 1 is a diagrammatic side elevation of a molding machine in accordance with the invention.

Fig. 2 is a corresponding end elevation.

Fig. 3 is a quadrantal section of the machine in the same direction as Fig. 2, the section being on line 3—3 of Fig. 4.

Fig. 4 is a section on line 4—4 of Fig. 3.

Fig. 5 is a perspective view of one of the molds, one member thereof being omitted for clearness.

Fig. 6 is a sectional view of the mold, being a section on line 6—6 of Fig. 5.

Fig. 7 is an elevation of a one of two wider side members of a mold, and Fig. 8 is a section on line 8—8 of Fig. 7.

Fig. 9 is a section of four interconnected members of a mold, being a section on the line 9—9 of Fig. 7.

Fig. 10 is an elevation of a wider side member as viewed from the inner side in the direction of arrow 10, Fig. 9.

Fig. 11 is an elevation of one of two end members of a mold, and Fig. 12 is a section (to a larger scale) on line 12—12 of Fig. 11.

Fig. 13 is a fragmentary section of a constructional detail viewed as in Fig. 3 but being a modification.

Figs. 14, 15 and 16, respectively, are similar sections of other constructional details which are other modifications.

Fig. 17 shows a brick such as the molds in the example would produce.

Referring to Figs. 1 and 2, upon a suitable base 20, pedestals 21, 22 are aligned in pairs each pedestal supporting one of four rollers 23, which are arranged in pairs on shafts 23a. The rollers 23 function as rolling supports for an outer cylinder 24 which is a component of a rotor. As shown by Fig. 1, the rotor is horizontal (i. e. rotates about a horizontal axis). Two (at least) of the rollers function also as drivers of the rotor, such two rollers being on one of said shafts which is rotated by a belt drive 25 applied to a pulley 26 on said one of the shafts. The drive to the rotor is controllable as regards speed through a variable speed transmission. One type of such control is illustrated, the pulley 26 being a cone pulley driven by the belt 25 from the usual reversed cone (not shown) which receives and transmits motion from any approved source of energy, the belt-and-pulley gearing operating through belt-shifting means (also not shown) in well known manner. In the example shown, the rotor cylinder 24 is in frictional driving contact with the driving rollers 23. The cylinder 24 is provided with strengthening rings 27, which maintain it against distortion, and with flanged rings 28 which rest upon the rollers 23. The flanges of these rings 28 position the rotor in relation to the rollers.

As Fig. 3 shows, the flanged ring 28 at each end of the cylinder is bolted to a ring 29 which is secured by rivets to the cylinder 24. Within an annular recess in the ring 29 is fitted an end-closing cover plate 30 secured by a bolt 31 and screws 32 (Fig. 2) to which cover is attached a reinforcing angle-iron ring 33. The screws 32 pass through a series of slotted holes 34 (Fig. 2). Thus, by removing the bolt 31 and giving a partial rotation to the cover 30 the holes pass under the screw heads and the cover is removable.

An annular series of rails 35 (Fig. 3) are bolted to the inner side of the cylinder 24. In the example there are sixteen of these rails. They are arranged axially, i. e. longitudinally, of the cylinder and are equispaced angularly around the cylinder axis of rotation. Each of these rails has two flanges 36. The rails 36 serve to give complete support and guidance, during the assembly and dismantling of the parts in the cylinder 24, to sixteen rows of molds each consisting of two wider side members 37, two end members 38 and one narrower side member 39. In the example, the rotor cylinder 24 is intended to be long enough to hold seven molds per row, so that the total capacity of the machine will be one hundred and twelve molds. It will be seen that the molds occupy an annular space which constitutes a molding zone. The molds will be described hereinafter.

Near the radially inner portions of the molds, their wider side members 37 are flanged at 40 to provide recesses into which are slid flexible strips 41, made of rubber or the like, which fit between adjacent molds of the annular series thereof. Each strip 41 extends from one end of the rotor to the other, being held in place at each end by a resilient (e. g. rubber) ring 42 (Fig. 3) checked for positioning purposes into the angle-iron ring 33. The strips 41 are so flexible that they are easily influenced by centrifugal force to seal themselves against the flanges 40. The strips 41 serve mainly as inter-mold excluders, as will be hereinafter explained, and also help to hold the molds at their inner ends in proper co-relationship and to damp down vibrations in the operation of the machine. It will be seen (Fig. 4) that the excluders are in radial alignment with the rails 35.

The rotor includes also an inner cylinder which comprises chiefly an annular series of segments 43, of which there are three in the example. Each of these segments extends from end to end of the rotor, being reinforced at each end with a part-ring or segment 44 (Fig. 4) which is secured by rivets to the respective segment end and which abuts against the ring 42. Each segment 43 has pinned to it, in the example according to Fig. 3, by split rivets 45 the group of excluders 41 with which it is associated, and so these excluders serve not only to exclude plastic material from the inter-mold spaces but also to hold the inner-cylinder segments 43 in proper relationship with the molds. The segments 43 are loosely fitted in juxtaposition to define the inner periphery of the annular molding zone and the adjacent edges of each two juxtaposed segments are spaced apart, as slightly as practicable, as indicated at 46 in Fig. 3. Each segment is perforated gridwise with holes 47 arranged in groups which register with the mouths of the molds, as shown in Figs. 3, 4 and 9. Thus, each mold is open at its radially inner end and its open mouth is screened by the inner cylinder, access being had to the mold from the rotor interior only through the holes 47. The portions of the inner cylinder between the holes 47 are in effect grid-bars or webs or membranes denoted by 47A (hereinafter and in the claims called "bars" or "grid-bars") there being a group of these bars across the mouth of each mold so as to screen the mouth. The inner-cylinder segments are held securely in place at each end by a strong spring ring 48, split at 49 (Fig. 4). This ring has a flange 50 which abuts against the cover plate 30 and the inner cylinder parts 43, 44.

To facilitate removal of the annular end fittings of the rotor from the outer cylinder 24, the split-ring flange 50 is recessed at 51 to permit entry of a pinching lever. For the same purpose the part-rings 44 are formed with notches one of which, marked 52, is shown at each end of the rotor in Fig. 4. Moreover, the cover plates 30 are formed with hand holes 53, each of which is normally closed by a pivot plate 54.

The molds shown in the drawings are meant to mold bricks such as shown in Fig. 17. As therein shown the brick has wider side faces 55, narrower side faces 56 and end faces 57. The faces 55 are each formed with a longitudinal channel 58 and a side channel 59. These channels provide passages for reinforcement rods or other material to be run or inserted along and between horizontal and vertical courses of bricks built as a structure; for instance, reinforcement rods may be embedded in mortar in said channels. Such a form of mold is given merely by way of illustration. It will be obvious that the form of the mold will be varied in practice to suit the form of the product.

Referring to the molds, each one of them consists of the five members 37, 37, 38, 38 and 39 and these respectively form the brick faces 55, 55, 57, 57 and 56, the latter face being the uppermost in Fig. 17. As Fig. 10 shows, each member 37 is made with formations 60 and 61 to form the reinforcement channels 58 and 59. The inner molding surfaces of the mold members are faced with plating 62 (Figs. 6 and 12). This face plating is shown secured by rivets to the mold members but could instead be detachable, and interchangeable face plates presenting any desired configurations or markings could be used.

The mold members, when inter-assembled, are detachably jointed to one another by roll-shaped formations 63 and socket-shaped formations 64. These formations constitute in effect sliding hinge joints, as each of them hinges and slides in relation to the other with which it mates. Each of the wider side members 37 has a socket formation 64 along the portion radially outermost in the assembled rotor (and uppermost in Fig. 5) and similar formations along its opposite end portions (vertical in Fig. 5). Each of the end members 38 has roll formations 63 along its side edges (vertical in Fig. 5). The narrower side member 39 also has roll formations 63 along its side edges (horizontal in Fig. 5). As Figs. 11 and 12 show, the rolls 63 on each of the end members 38 are slotted to receive blade springs 65, which are secured by rivets. These springs, when the associated rolls 63 are inserted in the mating sockets 64 of the wider side members 37, are depressed and bear hard against said sockets and in this way frictionally hold the members 37 and 38 together. In order to assemble the members of a mold, assuming them to be detached, one proceeds as follows: The narrower side member 39 is arranged to receive the two wider side members 37, and each of these latter members is slid fully into engagement with the appropriate edge roll 63 of member 39. The members 37 are held perpendicular to the member 39 and then the end members 38 are entered in the sockets 64 of members 37 and slid fully home. The arrangement is such that the assembled mold comprises members which are fully interlocked, seeing that the roll and socket formations of each sliding hinge joint can be detached only by an axial sliding motion; i. e. a motion in the direction of the hinge axis.

In order that the molds will be slidable between the rails 35 into the interior of the outer cylinder 24 of the rotor, each wider side member 37 at its radially outermost portion is formed with ribs 66 between which is provided a groove into which fits the appropriate rail flange 36. Thus the molds, when their members are completely inter-assembled, can be slid between the rails 35 from both ends of the rotor. To facilitate manipulation of the molds during their sliding motion, the end members 38 are formed with hand grips 67. Hand members 68 may be provided on the narrower side members 39, to assist in manipulating the molds, but such hand members may be omitted if desired. The flanges 40 on the wider side members 37 are formed to provide finger grasps by means of which, when a mold is removed from the rotor, one can swing the members 37 outwards about their upper sockets 34 (following detachment of the end members 36). Such outward hinging movement of the members 37 is rendered possible by leaving gaps at 69 between the mating sockets 64 and rolls 63.

The assembling of the rotor may proceed from both ends or from either end. The procedure is as follows:

The rotor outer cylinder 24 may with advantage be placed first with its rings 28 on the rollers 23 for insertion of the molds. The loading of the cylinder 24 is done in stages, it being the portion of the cylinder which is lowermost for the time being that is being dealt with. In order to insert each mold, it is registered between a pair of adjacent rails 35 with the ribs 66 engaging the respective flanges 36. The molds to be associated with one of the inner-cylinder segments 43 are all inserted in this way and are moved along the slideway formed by the respective rails into the annular molding zone within the outer cylinder 24. The excluders 41 and inner-cylinder segments 43 are put into working position, the excluders being placed between adjacent inserted molds and being arranged in engagement with the approximately dove-tailed recesses formed by the flanges 40 and the adjacent portions of the side members 37. Each pair of rails 35, when fully loaded supports a row of seven molds. The outer cylinder 24 is turned to bring another portion to be loaded into the lowermost position.

At each end of the rotor, the rubber rings 42 and 69 (Fig. 4) are inserted after the outer cylinder has been turned stage-by-stage and is fully loaded with rows of molds and the flanged end ring 28 is placed over the ring 29 and bolted thereto. The cover plate 30 with its ring 33 are then positioned, and locked in place by the set screw 31. The inner-cylinder segments 43 are retained in place by inserting the strong spring rings 48. In this way the assembled molds are secured longitudinally.

The rotor is then ready to be set in rotation, and this is done by means of the drive through the rollers 23. When rotation at required velocity is attained, the feeding and molding operations can proceed.

Concrete material in plastic well commingled condition is fed into the axial feed space enclosed by the perforated inner cylinder 43, whence said material is centrifugally impelled through the passages provided by the holes 47 into the molds. The grid-bars 47A screening each mold mouth serve to divide the concrete material into streams and thus to break-up the material into small quantities before entry into the mold. Thus, the material is uniformly distributed throughout all the molds and as regards each individual mold the material is supplied progressively, as through a sieve, and the mold is filled gradually, so as to ensure in the ultimate product a uniformly distributed and compactly consolidated constitution. Division and gradual filling of the material in the manner aforesaid facilitates extraction of fluid, gaseous or liquid, from the material progressively as the mold is being filled. Such division and gradual filling also facilitates chemical development not only within the molds but subsequently. Uniform distribution within the molded mass hinders or prevents stratification and furthers the production of a more perfect product. As the material collects at the radially outer portion of each mold interior the pressure due to centrifugal force squeezes any contained aqueous or gaseous fluid centripetally, i. e. radially inwards, from the material, and progressively closes or fills cavities, voids or the like. When the molds are full of plastic material, or substantially so, rotational velocity can be accelerated and continued at a selected speed until such centrifugal consolidation of the mold contents as is desired is completed. That is to say, the preliminary feeding and filling of the molds during the distributing action of the grid-bars 47A can be conducted at a lower speed than the later material-consolidating action. Additional material may be supplied, if needed, as compression proceeds. During this period surplus fluid matter continues to be expressed from the mold contents, moisture draining towards the interior of the rotor. Such matter may be collected for re-use, or run off, at will. The parts serving to retain in proper place the individual elements of the molds, the molds themselves and the excluders are, as the molding operation proceeds, assisted in their work by the centrifugal force, the assistance increasing as the rotational velocity increases. In particular, the excluders 41 as previously stated are flexible enough to ensure that under the centrifugal force they will automatically bear hard against the mold flanges 40 and will make tight joints therewith; that is to say, the excluders are centrifugally flexible. The tightness of the joints will increase with increase in rotational speed of the rotor. In addition, the excluders act as shock-absorbing spacing members between adjacent rows of molds.

Different degrees of consolidation are produceable by changes of rotational velocity, such changes being effected through the driving mechanism.

To obtain colour effect, selected pigment material is incorporated with the constituents of the concrete material preferably in dry condition. When thoroughly mixed the aggregate is rendered plastic by the addition of suitable fluid to obtain the necessary molding consistency and condition. Various classes of material of different specific gravity or different degrees of coarseness may be commingled and, when in a plastic condition, superimposed within the molds by feeding into the rotor interior in accordance with the order determined on and the general bulk of the bricks under construction.

On completion of consolidation of the material in the molds, rotation of the rotor is discontinued. To permit withdrawal of the molds, the parts 48, 43, 41, 30, 42 and 69 (see Fig. 4) are removed. When the split ring 48 at one end is removed, the recesses 52 are exposed for engagement by a pinching lever. The excluders 41 and the segments 43 are removed from their positions merely by forcing them inwards towards the rotor axis. Any surplus concrete is carried inwards by the segments and excluders as they fall inwards. There is therefore no need to slide these parts horizontally, which would be a heavy task in view of the obstruction by concrete material projecting from the mold mouths. The molds are then withdrawn along the rails 35, this being a simple task because the rails 35 are shielded by the excluders 41 during the supply of the concrete to the molds and are therefore free from obstruction by adhering concrete material. Surplus concrete material is removed from the mouths of the molds and they are set aside for the material to set sufficiently for extraction of the molded bricks from the molds. Extraction from each mold is effected by first removing the members 38 and then manipulating the members 37 by hinging them outwards. Then the brick can be removed from the member 39 for seasoning and drying.

In practice, the application of steam or other heated fluid, aqueous or gaseous, to the filled molds, or to the bricks when removed from the molds, has been considered beneficial to seasoning. The passage of steam through the molding zone within the rotor before removal of the molds could be effected by way of inlet and outlet holes 70 (Fig. 2) in the cover plate 30. Alternatively, the filled molds could be transferred to a heated chamber.

The construction of the centrifugal molding assembly according to Figs. 1 to 12 is as aforesaid simply an example. Variations in constructional features and details may be made.

For instance, in Fig. 3 the inner-cylinder segments 43 have been shown almost abutting, at 46, but independent of one another. If desired, as Fig. 13 shows, adjoining segment edges may be provided with tongue-joint means. Such means comprise extension plates 71 riveted to the one segment edge to provide a recess, and shoulder plates 72 riveted to the other segment edge to provide abutments for the plates 71. The latter edge constitutes the tongue of the joint, being tapered at 73 to facilitate entry into the recess whenever the segments 43 are assembled as the inner cylinder within the rotor.

Moreover, in the Fig. 3 construction, the only connection between the radially inner ends of the molds is provided by the excluders 41. These excluders leave unobstructed small wedge spaces, marked 74 in Fig. 3, which may with advantage be blocked, more especially in the case of wider molds in which case these spaces 74 would be greater. For example, wider molds would be necessary for bricks of the same dimensions (Fig. 17) if it were decided to mold them not with the narrower faces 56 but with the wider faces 55 radially inwards and outwards. A form of blocking means is shown in Fig. 14. As shown, the blocking means comprises a facing 75 which is secured by rivets to the associated inner-cylinder segments 43 and is formed with tangential surfaces upon which the radially inner edges of the mold members 37 and 38 seat themselves. The facing 75 therefore assists the associated excluder 41 to exclude material from the inter-mold spaces and also to hold the molds in their proper relationship to one another and to the associated segment 43. That is, each facing 75 acts as a stabilizing seat for the associated molds. Each facing 75 may be of metal, or like the excluders 41 of rubber or the like. Each facing 75 is cut away wherever it registers with the openings 47 in order not to obstruct the passage of molding material into the molds.

The excluders 41 may be unconnected with the inner-cylinder segments, as Fig. 15 shows.

In an alternative arrangement, the excluders comprise guide rails which are parts of the same rigid structures as the corresponding rails 35. For example, as Fig. 16 shows, an excluder is formed as a rail 76 which extends longitudinally and in radial alignment with the corresponding rail 35, both rails being interconnected at intervals by a web which is denoted by 77. The inner rail 76 is configured in section with flanges 78 to mate with the molds which it supports. The mold members 37 may as shown be formed with additional ribs 79 to ensure more secure engagement between the inner rail and the molds. In such an arrangement the inner-cylinder can be rigidly secured by screws 80 to the inner rails.

The inner-cylinder may be incorporated in the rotor not as a segmental structure but as a single unit which is a more or less permanent component thereof. When the inner-cylinder is segmental screws 80 may be omitted to facilitate removal of each segment.

I claim:

1. An assembly for molding by centrifugal force comprising an outer cylinder, a coaxial inner cylinder enclosing a feed space, an annular series of rails spaced around the inner side of said outer cylinder and extending axially, a plurality of molds with mouths directed radially inwards, each of said molds being slidably engaged at its outer end between a pair of adjacent rails belonging to said series and said rails and molds being configured in cross-section where they interengage so that the rails form a complete support and slideway for the molds, said cylinders, molds and associated parts being rotatable as a unit about the axis of said cylinders and said inner cylinder being formed with passages for plastic material pressed under centrifugal force from said feed space into said molds, and centrifugally flexible members interposed between adjacent molds to give shock-absorbing support to the molds and also to shield said rails from said plastic material by excluding said material from inter-mold spaces.

2. An assembly as defined by claim 1 comprising also facings on said inner cylinder to serve as location seats for said molds and to assist said centrifugally flexible members to exclude said material from the inter-mold spaces.

3. An assembly as defined by claim 1 in which said inner cylinder comprises a series of arcuate segments, each of said segments being formed with grid-bars between which there are said passages, there being a group of said grid-bars screening the mouth of each mold.

4. An assembly for molding by centrifugal force comprising a horizontal outer cylinder, a coaxial inner cylinder which encloses within it a feed space to receive plastic material and between which and the outer cylinder an annular molding zone is provided, a plurality of molds fixed in said zone and formed with mouths, said inner cylinder comprising a circular series of arcuate segments of gridlike construction so as to form a material-distributing screen of spaced bars across the mouth of each mold, and expansible end rings inserted in said outer cylinder to hold said segments in position.

5. A rotary molding assembly adapted to mold by centrifugal force and comprising a horizontal outer cylinder, an inner cylinder coaxial therewith, an annular series of inwardly opening molds between said cylinders, said inner cylinder being a segmental structure whereof the segments are formed with grid-bars between which there are passages to the molds from a feed space within said inner cylinder, each of said molds having its mouth screened by a group of said grid-bars, and end means attached to said outer cylinder to position said segments in relation thereto and to the molds.

6. A plurality of individual molds arranged in rows side-by-side as a circular series of rows around a feed space, outer slideways holding and guiding said rows of molds at closed outer ends thereof, means for rotating said molds around said space to force plastic material centrifugally therefrom into said molds through open inner ends thereof, and centrifugally flexible members extending between said rows of molds to shield said slideways by excluding said material from inter-mold spaces and to give shock-absorbing support to said molds at said open inner ends.

7. A plurality of individual molds arranged in rows, means holding said rows of molds side-by-side as a circular series of rows, a cylinder within said circular series enclosing a feed space, said cylinder being formed with grid-bars between which there are passages leading from said feed space to said molds, there being a group of said grid-bars screening the mouth of each mold, means for rotating said cylinder and molds around said feed space to force plastic material centrifugally therefrom past said grid-bars in a distributed condition into said molds, slideways arranged as the said holding means at the radially outer ends of said molds to support and guide them, and centrifugally flexible elements extending between adjacent rows of said molds to shield said slideways by excluding plastic material from inter-mold spaces and to give shock-absorbing support to the radially inner ends of said molds.

8. A centrifugal molding machine embodying a horizontal rotor which comprises an outer cylinder, an inner cylinder formed with grid-bars between which there are through passages, said inner cylinder being arranged within said outer cylinder to leave an annular molding zone between both of said cylinders, a series of guide means extending longitudinally through said zone and rigidly secured to both of said cylinders to form therewith a rigid unit, and rows of molds adapted to slide into said zone under the guidance and support of said guide means, said molds each having a mouth which opens against said passages for supply therethrough of plastic molding material and each mold mouth being screened by a group of said grid-bars which act to distribute said material over all the molds and over each of their mouths.

9. In an assembly rotatable about an axis, a mold for molding plastic material under centrifugal force by rotation about said axis, said mold comprising a plurality of detachable members, roll configuration along opposite edges of certain of said members, and socket configurations along opposite edges of the others of said members, said roll and socket configuration of adjoining members inter-engaging to form sliding hinges and in this way to interlock the several said members.

10. In an assembly rotatable about an axis, a mold for molding plastic material under centrifugal force by rotation about said axis, said mold comprising an outer-end member and side wall members which form an open mouth at the radially inner end of the mold, all of said side members being detachably joined together and interlocked by interengaging roll-and-socket configurations and certain of said side members being detachably joined to said outer-end member also by roll-and-socket configurations, detachment of each of said members being affected by sliding it in relation to the adjoining members lengthwise of said configurations.

11. A rotatable assembly for molding bricks by centrifugal force comprising a horizontal outer support, a series of rails carried by said outer support, spaced rows of molds each slidable along said rails and completely supported at outer closed ends of the molds by said rails, an inner structure attached within said outer support and composed of spaced grid-bars screening inner open ends of the molds, said grid bars serving for distribution of brick-making material to said molds, and centrifugally flexible elements inserted between the rows of molds at their inner ends, said elements giving additional support to the molds and serving during rotation of the assembly to prevent obstruction of said rails by sealing spaces between the rows of molds against passage of said material under centrifugal force.

CHARLES WILLIAM WATSON.